Patented Oct. 9, 1928.

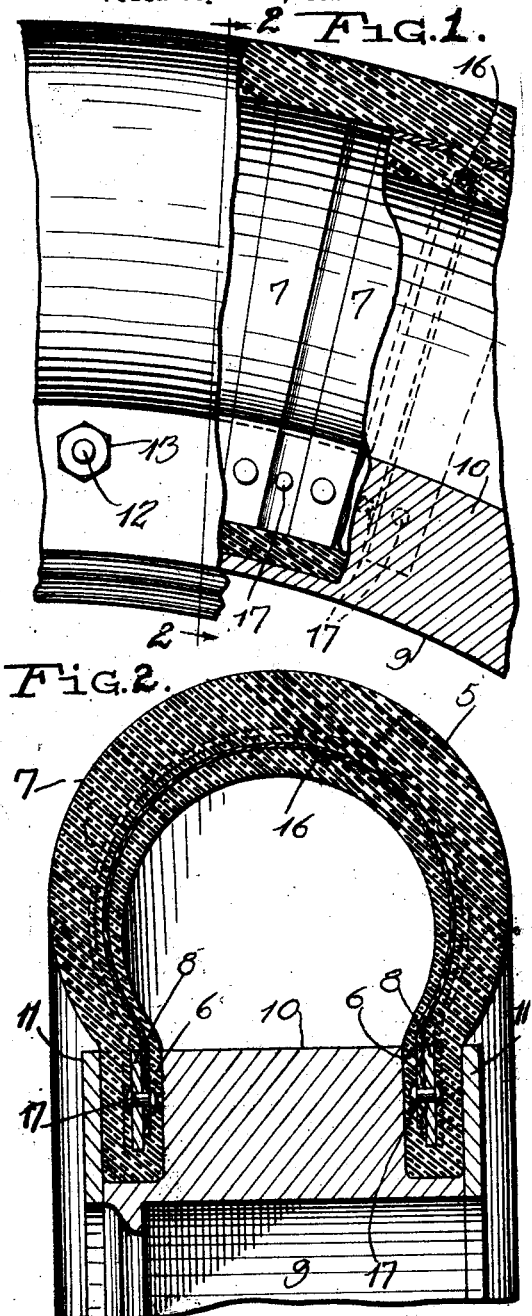

1,687,206

UNITED STATES PATENT OFFICE.

GABRIEL HATVANI, OF MEDINA, OHIO.

SPRING TIRE.

Application filed September 17, 1927. Serial No 220,150.

This invention relates to vehicle wheels and has particular reference to an improved form of spring tire and rim therefor.

The primary object of the invention is to provide an improved device of the above kind embodying a flexible resilient tire shoe having metallic leaf springs mounted embedded therein in a simple and efficient manner.

A more particular object is to provide a tire of the above type wherein radially disposed circumferential flat metal rings are embedded in the bead portions of the tire shoe and have the ends of U-shaped leaf springs which are embedded in the tire shoe, attached thereto, said bead rings having bolt openings whereby attaching bolts may be fastened through the same and the beads of the tire casing for effectively mounting the tire upon a rim.

A further object is to provide a tire rim of the above kind which is exceedingly simple and durable in construction, as well as efficient in use.

Other objects will become apparent as the nature of the invention is better understood and the same consists in the novel form, combination and arrangement of parts hereinafter more fully described, shown in the accompanying drawings and claimed.

In the drawing, wherein like reference characters designate corresponding parts throughout the several views, Figure 1 is an enlarged fragmentary detail view thereof, partly in side elevation and partly broken away and in circumferential section, and Figure 2 is a transverse section on line 2—2 of Figure 1.

Referring more in detail to the drawings, the present invention embodies a tire shoe or casing 5, preferably formed of rubber or rubber composition so as to be flexible and resilient, and split or divided at the inner side thereof to define straight sided bead portions 6. Embedded in the casing 5 so as to extend at the sides and tread portion thereof are transversely and radially disposed, as well as circumferentially spaced U-shaped metallic leaf springs 7. These springs are of sufficient strength to yieldingly sustain the load placed upon the tires so as to eliminate the necessity of using an inflatable inner tube, and embedded in and extending circumferentially of the bead portions 6 are radially disposed flat metal rings 8 to which the ends of the springs 7 are suitably securely connected. In this way, a reinforcing element is provided that may be assembled prior to building the tire shoe thereon and in which the members 7 form resilient means for yieldingly resisting deformation of the casing 5 to give the desired resiliency in the use of the tire.

The tire is adapted to be mounted upon a rim having side flanges against the inner side of which the bead portions 6 are adapted to engage. The rim embodies a member 10 adapted to project outwardly between the beads 6. The side flanges of the rim are indicated at 11, and in order to secure the tire upon the rim transverse bolts are passed through the rim section by passing through transversely alined openings in the side flanges 11 and in the rigid member 10 of the rim as well as in the beads 6 and rings 8. By thus passing the bolts 12 through the rings 8, the tire is effectively secured upon the rim without danger of the bolts pulling out of or tearing the beads 6, and removably threaded upon the stems of the bolts 12 are nuts 13 which may be conveniently removed when it is desired to dismount the tire from the rim.

In the form of the invention illustrated the rim is of relatively thick solid form so as to provide a single solid member 10 between the beads 6 of the tire casing, and the side flanges 11 are separate from and bolted to the rim by the bolts 12 so as to clamp against the outer sides of the tire beads and clamp the latter against opposite sides of the circumferential intermediate rim member 10. A further strip of reinforcing spring is provided for the tire, one of which as indicated at 16 is embedded in the tire shoe at a point between each pair of adjacent springs 7. The springs 16 are preferably formed of a plurality of strands of resilient wire twisted together and riveted as at 17 to the rings 8. These supplemental springs 16 are of substantially U-shape and are of slightly smaller size than the springs 7 so as to be embedded in the sides and tread portion of the tire casing 5 inwardly of the springs 7 as indicated. By forming the springs 16 of twisted strands of wire, they may be securely vulcanized in place to supplement the action of the springs 7 and adapt the tire to heavy duty as required for example when the wheel is employed upon trucks and the like. By the construction of rim shown illustrated both of the side flanges 11 may be removed so that only one of the bead portions 6 of the tire need be forced over the intermediate member 10 of the rim to remove the tire.

From the foregoing description it will be seen that I have provided a simple and durable form of tire of the type described which may be cheaply and easily manufactured. It will also be seen that simple and efficient means is provided for removably securing the tire upon a rim, whereby to withstand the severe usage to which devices of this kind will be put.

Minor changes may be made without departing from the spirit and scope of the invention as claimed.

What I claim as new is:

1. A spring tire comprising a flexible resilient shoe divided circumferentially at its inner side to provide straight-side beads, radially disposed flat metal rings embedded in and extending circumferentially of the beads, and circumferentially spaced radially and transversely disposed substantially U-shaped leaf springs embedded in the side and tread portions of the shoe and having their ends secured to said rings, and smaller U-shaped springs embedded in the shoe between the first springs and also secured at their ends to the rings.

2. A spring tire comprising a flexible resilient shoe divided circumferentially at its inner side to provide straight-side beads, radially disposed flat metal rings, embedded in and extending circumferentially of the beads, and circumferentially spaced radially and transversely disposed substantially U-shaped leaf springs embedded in the side and tread portions of the shoe and having their ends secured to said rings, and smaller springs embedded in the tire inwardly of the U-shaped springs and each embodying a plurality of strands of spring wire twisted together.

In testimony whereof I affix my signature.

GABRIEL HATVANI.